(12) United States Patent
Mahabadi et al.

(10) Patent No.: US 10,029,729 B2
(45) Date of Patent: Jul. 24, 2018

(54) SYSTEMS AND METHODS FOR CORNER BASED REFERENCE COMMAND ADJUSTMENT FOR CHASSIS AND ACTIVE SAFETY SYSTEMS

(71) Applicant: GM GLOBAL TECHNOLOGY OPERATIONS LLC, Detroit, MI (US)

(72) Inventors: Seyed Alireza Kasaiezadeh Mahabadi, Shelby Township, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 400 days.

(21) Appl. No.: 15/070,985

(22) Filed: Mar. 15, 2016

(65) Prior Publication Data

US 2017/0267281 A1     Sep. 21, 2017

(51) Int. Cl.
| | |
|---|---|
| *B60W 10/20* | (2006.01) |
| *B62D 6/04* | (2006.01) |
| *B62D 6/00* | (2006.01) |
| *B60W 50/08* | (2012.01) |
| *B60W 10/184* | (2012.01) |
| *B60W 50/00* | (2006.01) |

(52) U.S. Cl.
CPC .......... *B62D 6/003* (2013.01); *B60W 10/184* (2013.01); *B60W 10/20* (2013.01); *B60W 50/085* (2013.01); *B60W 50/087* (2013.01); *B62D 6/04* (2013.01); *B60W 2050/0012* (2013.01); *B60W 2520/105* (2013.01); *B60W 2520/125* (2013.01); *B60W 2520/14* (2013.01); *B60W 2540/04* (2013.01); *B60W 2540/12* (2013.01); *B60W 2540/18* (2013.01); *B60W 2720/26* (2013.01)

(58) Field of Classification Search
None
See application file for complete search history.

(56) References Cited

U.S. PATENT DOCUMENTS

| | | | |
|---|---|---|---|
| 5,941,919 A | 8/1999 | Pastor et al. | |
| 6,360,150 B1 * | 3/2002 | Fukushima | B60T 8/17552 303/140 |
| 2002/0147532 A1 * | 10/2002 | Inagaki | B60G 17/0195 701/41 |
| 2003/0093190 A1 * | 5/2003 | Mori | B60G 17/019 701/1 |
| 2003/0195689 A1 * | 10/2003 | Mori | G01L 5/20 701/70 |

(Continued)

FOREIGN PATENT DOCUMENTS

JP            07047968 A  *  2/1995

*Primary Examiner* — Shelley Chen
(74) *Attorney, Agent, or Firm* — Lorenz & Kopf, LLP (57) ABSTRACT

Methods and systems are provided for controlling a component of a vehicle. In one embodiment, a method includes: receiving, by a processor, data associated with a center of gravity of the vehicle; determining, by a processor, a wheel moment adjustment command for each wheel of the vehicle based on the received data; determining, by a processor, at least one control output based on driver commands and the wheel moment adjustment command for each wheel; and selectively controlling, by a processor, at least one component associated with at least one of an active safety system and a chassis system of the vehicle based on the at least one control output.

19 Claims, 6 Drawing Sheets

(56) References Cited

U.S. PATENT DOCUMENTS

| | | | |
|---|---|---|---|
| 2004/0267427 A1* | 12/2004 | Suzuki | B60T 8/1755 701/69 |
| 2006/0069480 A1* | 3/2006 | Hiwatashi | B62D 6/003 701/41 |
| 2007/0124051 A1* | 5/2007 | Fujita | B60G 17/0162 701/70 |
| 2008/0119988 A1* | 5/2008 | Yasui | B62D 6/003 701/41 |
| 2009/0132137 A1* | 5/2009 | Takenaka | B60T 8/1755 701/70 |
| 2009/0157262 A1* | 6/2009 | Lee | B60T 8/1755 701/42 |
| 2009/0171526 A1* | 7/2009 | Takenaka | B60T 8/17552 701/70 |
| 2009/0319114 A1* | 12/2009 | Takenaka | B60T 8/1755 701/48 |
| 2010/0094495 A1* | 4/2010 | Fujimoto | B60L 15/2036 701/22 |
| 2010/0174463 A1* | 7/2010 | Uragami | B60T 8/1755 701/70 |
| 2012/0029769 A1 | 2/2012 | Chen et al. | |
| 2012/0136563 A1* | 5/2012 | Obuchi | B60W 40/13 701/124 |
| 2012/0197469 A1 | 8/2012 | Ghoneim et al. | |
| 2015/0369704 A1* | 12/2015 | Egerszegi | G01M 17/04 701/32.8 |
| 2016/0272211 A1* | 9/2016 | Igarashi | B60W 30/18145 |

* cited by examiner

SYSTEMS AND METHODS FOR CORNER BASED REFERENCE COMMAND ADJUSTMENT FOR CHASSIS AND ACTIVE SAFETY SYSTEMS

TECHNICAL FIELD

The technical field generally relates to control systems of a vehicle and more particularly to methods and systems for adjustment of control to obtain a feasible command for vehicle control.

BACKGROUND

Active safety systems or chassis control systems are designed to improve a motor vehicle's handling, for example at the limits where the driver might lose control of the motor vehicle. The systems compare the driver's intentions, for example, by direction in steering, throttle, and/or braking inputs, to the motor vehicle's response, via lateral acceleration, rotation (yaw) and individual wheel speeds. The systems then control the vehicle, for example, by braking individual front or rear wheels, by steering the wheels, and/or by reducing excess engine power as needed to help correct understeer (plowing) or oversteer (fishtailing).

These systems use several sensors in order to determine the intent of the driver and to determine a driver intended state. Other sensors indicate the actual state of the motor vehicle (motor vehicle response). The systems compare driver intended state with the actual state and decide, when necessary, to adjust the commands for the actuators of the motor vehicle.

In some instances, yaw moment control can adversely affect the wheel slip when a large control action is requested by control systems. This may indirectly result in yaw instability. In order to mitigate the effects, the command should be subjected to tire/road capacity constraints which depend on road conditions, and normal tire forces. It is difficult to achieve an accurate estimation of road conditions. Even with an accurate estimation of road conditions, the existing approaches may fail to manage the interaction of yaw moment and force controllers with wheel slip in transient maneuvers. For example, when a large load transfer happens, the reduced vertical load will decrease the required lateral force capacity for yaw moment control purposes.

Accordingly, it is desirable to provide improved methods and systems for determining control commands for the actuators of the vehicle without an accurate estimation of road conditions. It is further desirable to provide methods and systems for determining the control commands using information from the vehicle corners. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for controlling a component of a vehicle. In one embodiment, a method includes: receiving, by a processor, data associated with a center of gravity of the vehicle; determining, by a processor, a wheel moment adjustment command for each wheel of the vehicle based on the received data; determining, by a processor, at least one control output based on driver commands and the wheel moment adjustment command for each wheel; and selectively controlling, by a processor, at least one component associated with at least one of an active safety system and a chassis system of the vehicle based on the at least one control output.

In one embodiment, a system includes a non-transitory computer readable medium. The non-transitory computer readable medium includes a first module that receives, by a processor, data associated with a center of gravity of the vehicle, and that determines, by the processor, a wheel moment adjustment command for each wheel of the vehicle based on the received data. The non-transitory computer readable medium further includes a second module that determines, by the processor, at least one control output based on driver commands and the wheel moment adjustment commands for each wheel. The non-transitory computer readable medium further includes a third module that selectively controls, by the processor, at least one component associated with at least one of an active safety system and a chassis system of the vehicle based on the at least one control output.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Figure 1:
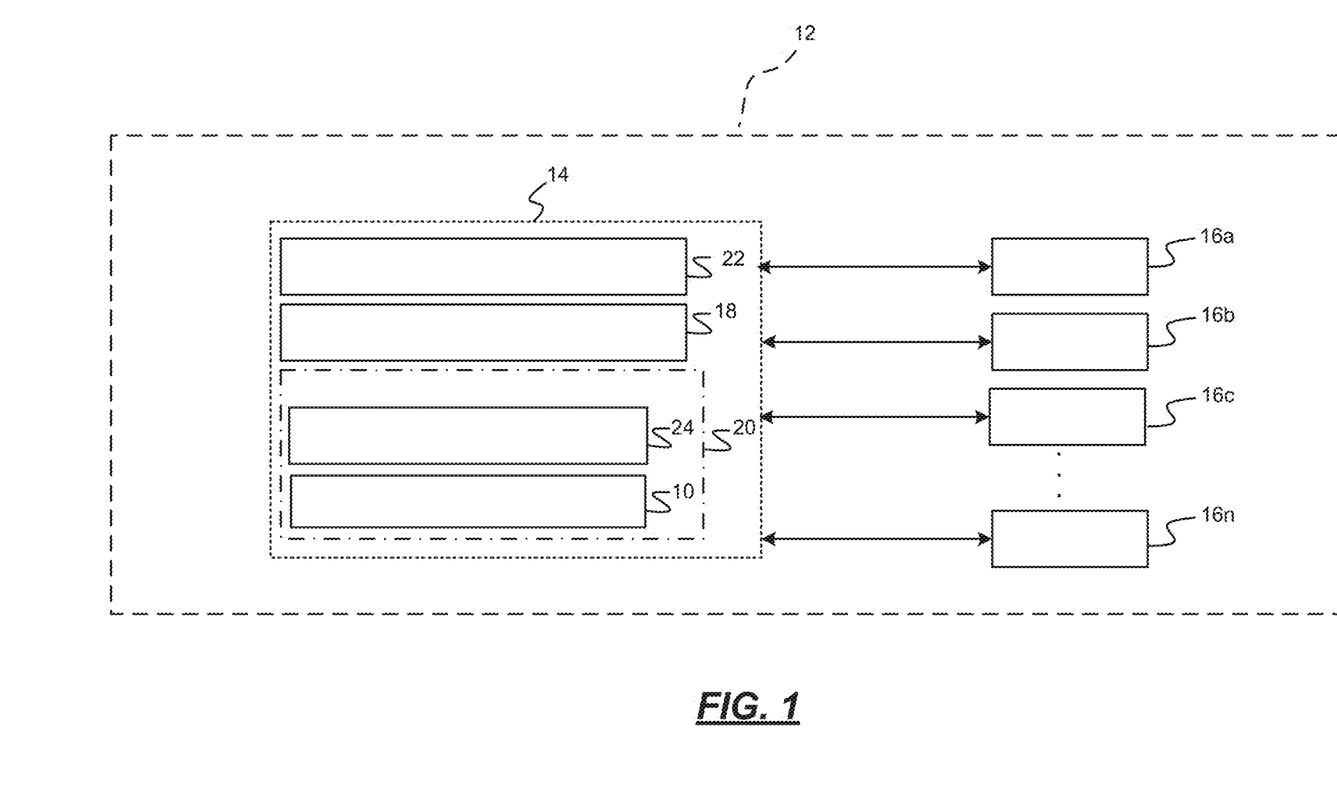
FIG. 1 is a functional block diagram of a vehicle that includes a corner based control system in accordance with various embodiments.

With reference now to FIG. 1, a vehicle 12 is shown to include corner based control system 10 in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to scale.

As shown, the vehicle 12 includes a control module 14. The control module 14 controls one or more components 16a-16n of the vehicle 12. The components 16a-16n may be associated with a chassis system or active safety system of the vehicle 12. For example, the control module 14 controls vehicle components 16a-16n of a braking system (not shown), a steering system (not shown), and/or other chassis system (not shown) of the vehicle 12. By definition, the vehicle 12 includes a center and four corners, a left front corner, a right front corner, a left rear corner, and a right rear corner. The components 16a-16n are associated with each of the four corners to control the operation of the vehicle 12 at the respective corner.

In various embodiments, the control module 14 includes at least one processor 18, memory 20, and one or more input and/or output (I/O) devices 22. The I/O devices 22 communicate with one or more sensors and/or actuators associated with the components 16a-16n of the vehicle 12. The memory 20 stores instructions that can be performed by the processor 18. The instructions stored in memory 20 may include one or more separate programs, each of which comprises an ordered listing of executable instructions for implementing logical functions.

In the example of FIG. 1, the instructions stored in the memory 20 are part of a main operating system (MOS) 24. The main operating system 24 includes logic for controlling the performance of the control module 14 and provides scheduling, input-output control, file and data management, memory management, and communication control and related services. In various embodiments, the instructions are further part of the corner based control system 10 described herein.

When the control module 14 is in operation, the processor 18 is configured to execute the instructions stored within the memory 20, to communicate data to and from the memory 20, and to generally control operations of the vehicle 12 pursuant to the instructions. The processor 18 can be any custom made or commercially available processor, a central processing unit (CPU), an auxiliary processor among several processors associated with the control module 14, a semiconductor based microprocessor (in the form of a microchip or chip set), a macroprocessor, or generally any device for executing instructions.

In various embodiments, the processor 18 executes the instructions of the corner based control system 10. The corner based control system 10 generally determines one or more states of motion of the vehicle 12 given the driver's intent (as indicated by one or more sensors associated with the braking system and/or steering system, also referred to as the driver's demand). The corner based control system 10 determines one or more control commands based on tire force estimations, actuator availability, and a corner based methods and systems of the present disclosure. The corner based methods and systems take into account sensed information from the corners of the vehicle when determining the control commands. The corner based control system 10, when the driver demand or any other control command in the vehicle 12 is not feasible, determines a possible command that matches best to the original demand/commands and considering the vehicle/road limitation and constraints including, but not limited to, the slippery road condition and actuators limits.

Figure 2:
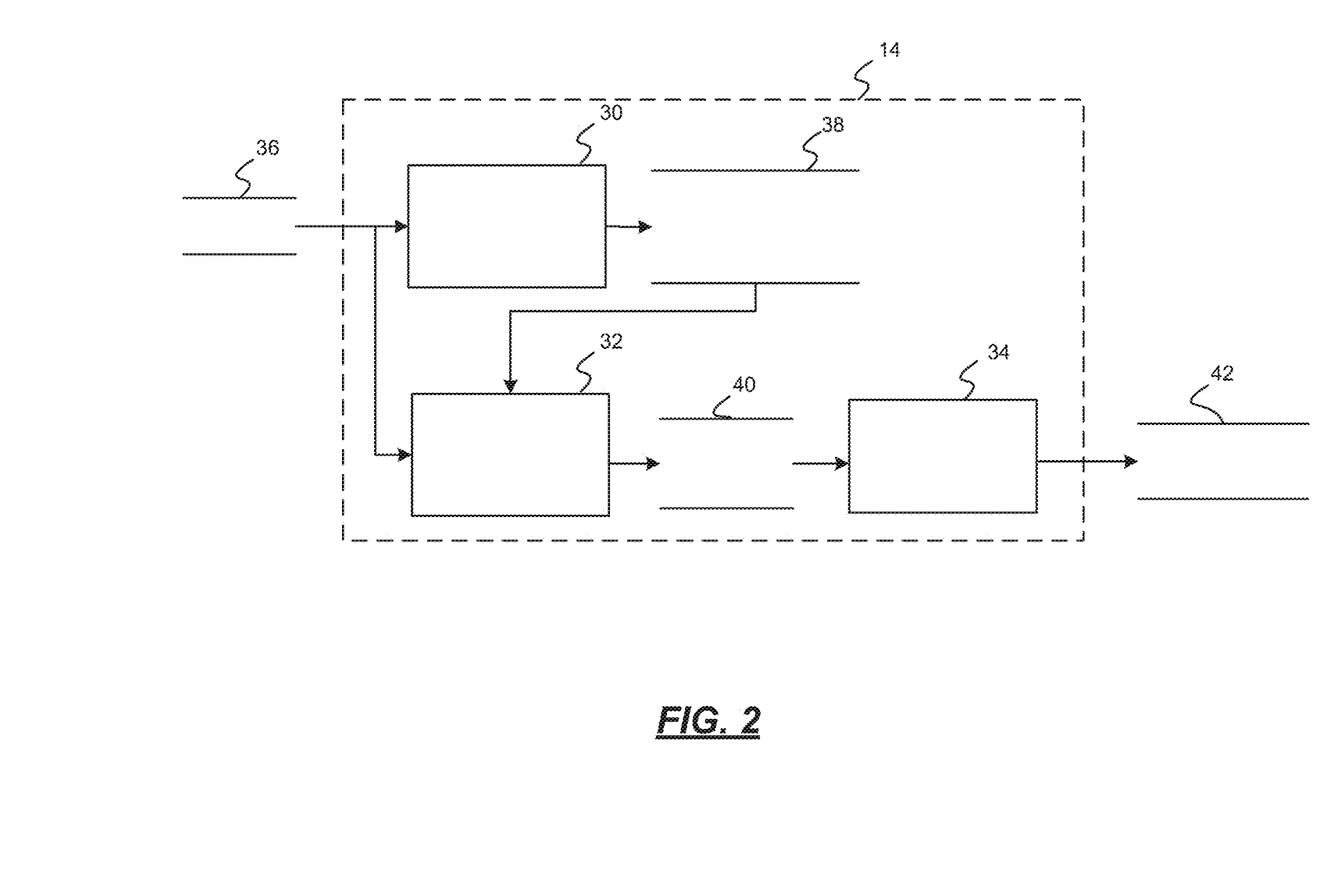
FIGS. 2 and 3 are dataflow diagrams illustrating control systems in accordance with various embodiments.

Referring now to FIG. 2 and with continued reference to FIG. 1, a dataflow diagram illustrates the corner based control system 10 in more detail in accordance with various exemplary embodiments. As can be appreciated, various exemplary embodiments of the corner based control system 10, according to the present disclosure, may include any number of modules and/or sub-modules. In various exemplary embodiments, the modules and sub-modules shown in FIG. 2 may be combined and/or further partitioned to similarly determine a control command based on corner information and to control actuators of the vehicle 12 based thereon. In various embodiments, the corner based control system 10 receives inputs from the one or more sensors associated with the components 16a-16n of the vehicle 12, from other control modules (not shown) within the vehicle 12, and/or from other modules (not shown) within the control module 14. In various embodiments, the control module 14 includes a wheel slip command adjustment module 30, a command blending module 32, and an actuator control module 34.

The wheel slip command adjustment module 30 receives as input CG level data including yaw moment data and/or the longitudinal and/or the lateral forces data from higher level controllers (e.g., $G_z^*$, $F_x^*$, $F_y^*$, etc.). Based on the received data 36, the wheel slip command adjustment module 30 determines wheel moment adjustment commands 38 for each wheel. For example, a proportional integral (PI) controller that compensates for error between desired and actual velocity can be used. Initially, a desired slip ratio ($\lambda_d$) is selected based on tire characteristics. A desired wheel velocity ($\omega_d$) is then determined based on the desired slip ratio. For example:

$$\omega_d = \begin{cases} \text{When Slip} > 0 \ \omega_d = V_c / (R_{\mathit{eff}} * (1 - \lambda_d)) \\ \text{When Slip} < 0 \ \omega_d = V_c / (R_{\mathit{eff}} * (1 + \lambda_d)) \\ \text{When Slip} = 0 \ \omega_d = V_c / R_{\mathit{eff}} \end{cases} \quad (1)$$

Thereafter, the desired wheel moment adjustment command 38 is determined for control slip as:

$$G_w^* = Jw(\dot{\omega}_d - \dot{\omega}_a) = -K_p(\omega_d - \omega_a) - K_I(\int(\omega_d - \omega_a)), \quad (2)$$

where $\omega_d$, $\omega_a$ are desired and actual wheel velocities, respectively.

The command blending module 32 receives as input the desired wheel moment adjustment commands 38 for each wheel. The command blending module 32 blends the determined and the driver commands (e.g., yaw moment, longitudinal, and lateral commands, etc.) and any corrections including the wheel slip correction as well as steering corrections.

For example the command blending module 32 determines a feed forward map from the CG command to the corner force/torques. This provides the force at each wheel considering the wheel/tire slips. In case of no slip (and consequently no slip control re-action) the feed forward map distributes the CG commands to the corners.

Figure 3:
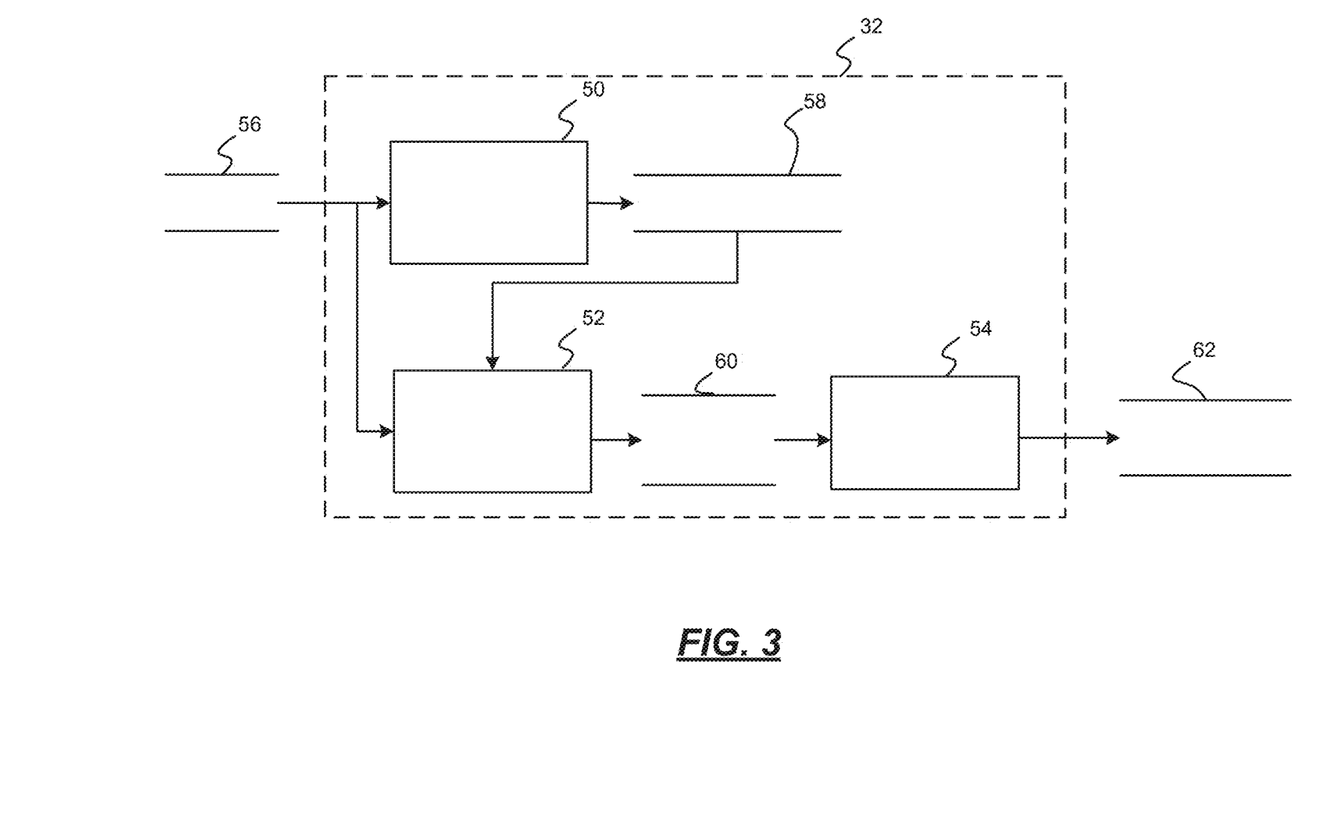

For example, as shown in FIG. 3, the command blending module 32 includes one or more sub-modules. In various embodiments, the command blending module 32 includes a math model determination module 50, a controller determination module 52, and a final solution determination module 54.

Figure 4:
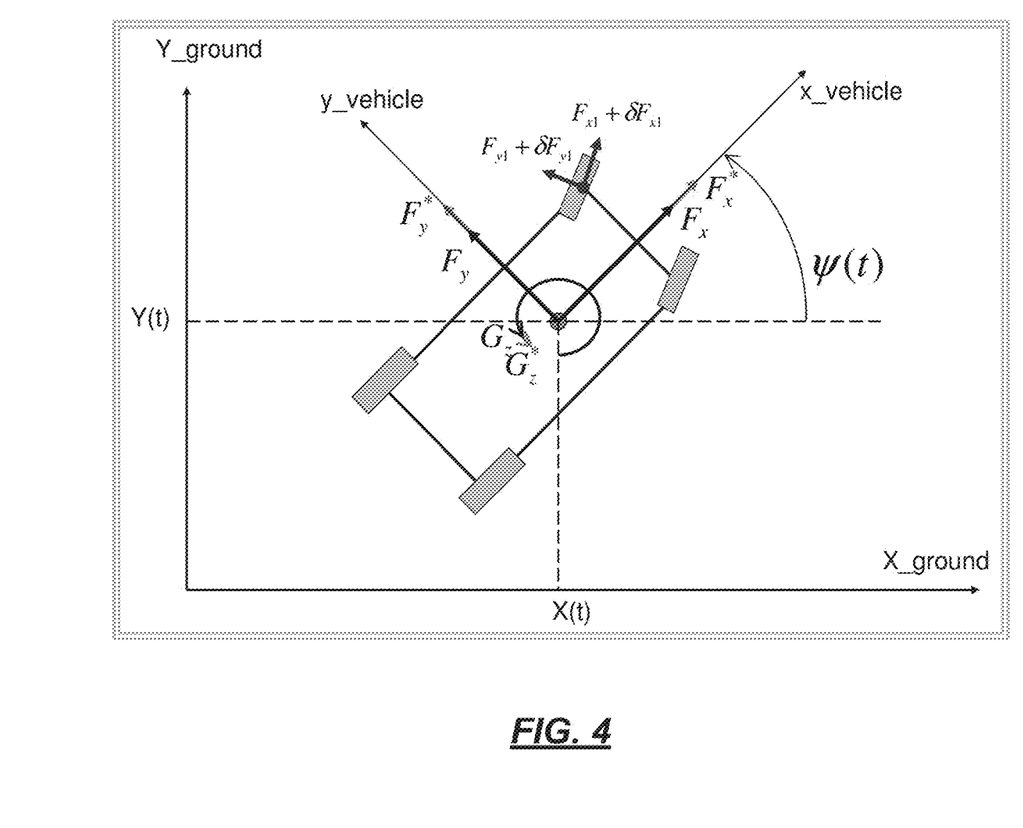
FIG. 4 is an illustration of forces acting upon the vehicle.

The math model determination module 50 generates a general math model 58 of the current vehicle dynamics. The general math model 58 includes dynamics of each of the wheels and the dynamics of the vehicle body. For example, provided the illustration in FIG. 4, the math model determination module 50 generates a model with six degrees (or any other number) of freedom: $F_x$, $F_y$, $F_z$, $G_x$, $G_y$, $G_z$ as:

$$F_x = \Sigma_{i=1}^{4}(F_{xi}\cos(\delta_{si}) - F_{yi}\sin(\delta_{si})), \quad (3)$$

$$F_y = \Sigma_{i=1}^{4}(F_{xi}\sin(\delta_{si}) + F_{yi}\cos(\delta_{si})), \quad (4)$$

$$F_z = \Sigma_{i=1}^{4}(F_{zi}), \quad (5)$$

$$G_x = w\Sigma_{1,3}(F_{zi}) - w\Sigma_{2,4}(F_{zi}), \quad (6)$$

$$G_y = a\Sigma_{3,4}(F_{zi}) - b\Sigma_{1,2}(F_{zi}), \quad (7)$$

$$G_z = a\Sigma_{i=1,2}(F_{xi}\sin(\delta_{is}) + F_{yi}\cos(\delta_{si})) - b\Sigma_{i=3,4}(F_{xi}\sin(\delta_{si}) + F_{yi}\cos(\delta_{si})) + w\Sigma_{2,4}(F_{xi}\cos(\delta_{si}) - F_{yi}\sin(\delta_{si})) - w\Sigma_{1,3}(F_{xi}\cos(\delta_{si}) - F_{yi}\sin(\delta_{si})), \quad (8)$$

and $$G_{wi} = Q_i - R_{eff} \times F_{xi}. \quad (9)$$

The controller determination module 52 then defines a controller design output 60 given the math model 58 which minimizes the error between desired dynamics and actual dynamics. For example, given the total tire force vector is:

$$f = \{f_1, \ldots, f_8\}^T = \{F_{x1}, F_{y1}, F_{x2}, F_{y2}, F_{x3}, F_{y3}, F_{x4}, F_{y4}\}^T. \quad (10)$$

The CG force error vector is:

$$E = [E_x\ E_y\ E_z\ E_{w1}\ E_{w2}\ E_{w3}\ E_{w4}]^T = \ldots [F_x^* - F_x\ F_y^* - F_y\ G_z^* - G_z\ G_{w1}^* - G_{w1}\ G_{w2}^* - G_{w2}\ G_{w3}^* - G_{w3}\ G_{w4}^* - G_{w4}]^T. \quad (11)$$

The CG force error adjusted is:

$$F_x^* - F_x(f+\delta f) = F_x^* - \left[F_x(f) + \frac{dF_x(f)}{df}\delta f\right] \equiv E_x - \frac{dF_x(f)}{df}\delta f$$

$$F_y^* - F_y(f+\delta f) = F_y^* - \left[F_y(f) + \frac{dF_y(f)}{df}\delta f\right] \equiv E_y - \frac{dF_y(f)}{df}\delta f \quad (12)$$

$$\underbrace{G_z^*}_{target} - \underbrace{G_z(f+\delta f)}_{actual\,adjusted} = G_z^* - \left[G_z(f) + \frac{dG_z(f)}{df}\delta f\right] \equiv G_z - \frac{dG_z(f)}{df}\delta f$$

$$\underbrace{G_{wi}^*}_{target} - \underbrace{G_{wi}(f+\delta f)}_{actual\,adjusted} =$$

$$G_{wi}^* - \left[G_{wi}(f) + \frac{dG_{wi}(f)}{df}\delta f\right] \equiv G_{wi} - \frac{dG_{wi}(f)}{df}\delta f.$$

The resulting target function is:

$$P = \tfrac{1}{2}(E - A_F C\delta f)^T W_E(E - A_F C\delta f) + \tfrac{1}{2}(C\delta f)^T W_{df}(C\delta f) + \tfrac{1}{2}[C(f+\delta f)]^T W_{df}[C(f+\delta f)] \quad (13)$$

Where C represents a contribution matrix that defines the availability of actuators. For example, the realtime availability of the actuators can depend on failures of any actuator, and/or current vehicle configuration. The failure of any of the actuators can be determined by any fault detection algorithm and reported to the corner based control system 10. The current vehicle configuration may be automatically configured or configured by a user. For example, the vehicle 12 may be currently operating in four wheel drive or two wheel drive (as selected by the driver).

After determining the realtime availability of the actuators, the contribution matrix "C" is reconfigured to include only the available actuators for optimal actuation distribution. For example, the matrix "C" is a diagonal matrix in which each diagonal element corresponds to a particular actuator. Each diagonal element can be either one (available) or zero (not available).

The final solution determination module 54 then determines a final solution 62 of a HVC map given the contribution matrix "C" and the control design output 60. For example, the final solution 62 is:

$$\delta f = C^{-1}[W_f + W_{df} + C^T A_F^T W_E A_F C]^{-1}[C^T A_F^T W_E E - W_f C f]. \quad (14)$$

Assuming that $C[W_f + W_{df} + C^T A_F^T W_E A_F C] \neq 0$ and that the relation is invertible.

With reference back to FIG. 2, thereafter, the command blending module corrects the CG commands using an inverse map from the corners to CG. For example, using the equations as discussed above, the inverse map can be determined, for example given the total tire force vector:

$$f = \{f_1, \ldots, f_8\}^T = \{F_{x1}, F_{y1}, F_{x2}, F_{y2}, F_{x3}, F_{y3}, F_{x4}, F_{y4}\}^T, \quad (15)$$

The inverse map is:

$$G_{z_{adj}}^* = A_F C f, \quad (16)$$

where $A_F$ is the Jacobian matrix defined above, and C is the contribution matrix that defines the availability of actuators.

Therefore, the general analytical solution based on the previous steps is:

$$E_{adj} = \underbrace{A_F}_{Inverse\,map} \underbrace{[W_f + W_{df} + A_F^T W_E A_F]^{-1}[A_F^T W_E E]}_{Feedforward\,map}. \quad (17)$$

As an example, the adjusted yaw moment control command is a linear combination of commands and corrections:

$$G_{z_{adj}}^* = \gamma_{xz} F_x^* + \gamma_{yz} F_y^* + \gamma_{zz} G_z^* + \Sigma_{i=1}^{4}(\kappa_{iz} G_{w_i}^*), \quad (18)$$

Where $\kappa_{iz} = \kappa_{iz}(L_f, L_r, T, R_{eff}, \delta, W_j)$ and $\gamma_{iz} = \gamma_{iz}(L_f, L_r, T, R_{eff}, \delta, W_j)$. $G_{w_i}^*$ represent higher level controller output for wheel dynamics (corrections), and $L_f$, $L_r$, T, $R_{eff}$, $\delta$, $W_j$, represent distances from front and rear axles to CG, track, effective radius, steering angle, and final HVC weights, respectively. $F_x^*$, $F_y^*$ and $G_z^*$ represent commands for longitudinal, lateral forces and yaw moment based on driver demands.

The actuator control module 34 receives the adjusted commands 40. The actuator control module 34 assigns actuator level tasks 42 to the actuators associated with the components 16a-16n of the vehicle 12 based on the adjusted commands 40.

Figure 5:
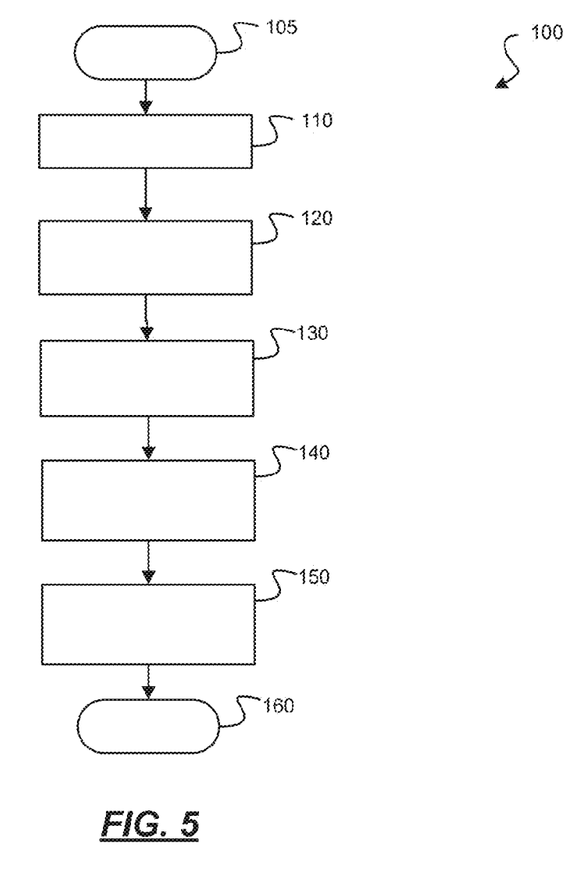
FIGS. 5 and 6 are flowcharts illustrating control methods in accordance with various embodiments.
Figure 6:
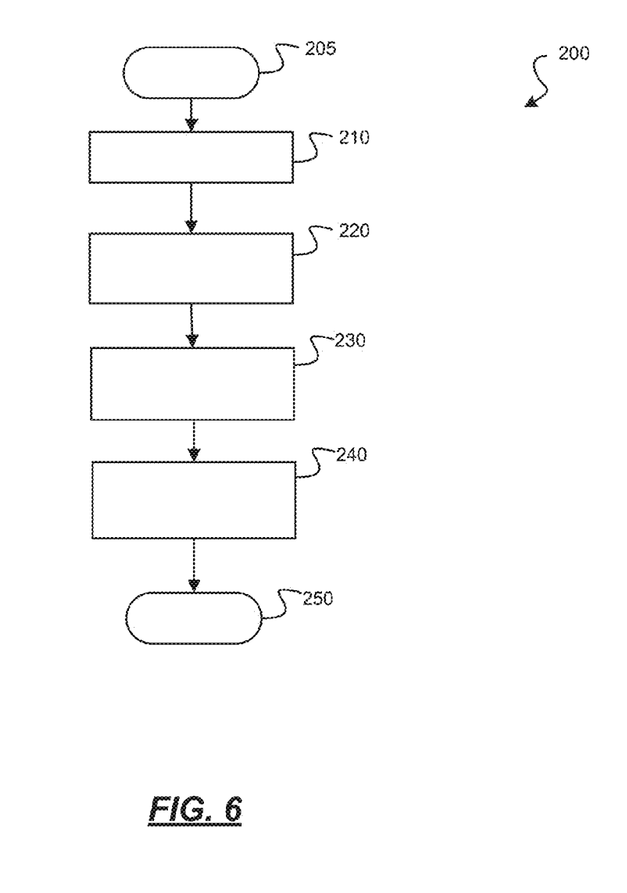

With reference now to FIGS. 5 and 6, and with continued reference to FIGS. 1 through 4, flowcharts illustrate method 100 and 200 for determining the adjusted command and controlling one or more components 16a-16n of the vehicle 12 based thereon. The methods 100 and 200 can be implemented in connection with the vehicle 12 of FIG. 1 and can be performed by the corner based control system 10 of FIGS. 2 and 3, in accordance with various exemplary embodiments. As can be appreciated in light of the disclosure, the order of operation within the methods 100 and 200 is not limited to the sequential execution as illustrated in FIGS. 5 and 6, but may be performed in one or more varying orders as applicable and in accordance with the present disclosure. As can further be appreciated, the methods 100 and 200 of FIGS. 5 and 6 may be enabled to run continuously, may be scheduled to run at predetermined time intervals during operation of the vehicle 12 and/or may be scheduled to run based on predetermined events.

With initial reference to FIG. 5, in various embodiments, the method 100 may begin at 105. The yaw moment data and/or the longitudinal and/or the lateral forces data from the existing higher level controllers (e.g., $G_z^*$, $F_x^*$, $F_y^*$, etc.) at the CG level are received at 110. Based on the received data, the wheel moment adjustment commands are determined for each wheel at 120. The adjustment commands and any corrections are then blended using the feed forward map to the corners and the inverse map to the CG at 130. Thereafter, the blended commands are then sent to a lower level controller to assign the actuator level tasks at 140. The lower level control then generates control signals to control the actuators based thereon at 150. Thereafter, the method may end at 160.

With reference now to FIG. 6, the method 200 illustrates various embodiments of a method for determining the HVC map. In various embodiments, the method 200 may begin at 205. The general math model of the vehicle dynamics including the wheel dynamics as well as vehicle body dynamics is determined at 210. The controller design output 60 is determined at 220. The available actuators are determined at 230 and the final solution 62 is determined based thereon at 240. Thereafter, the method may end at 250.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a component of a vehicle, comprising:
    receiving, by a processor, data associated with a center of gravity of the vehicle;
    determining, by a processor, a wheel moment adjustment command for each wheel of the vehicle based on the received data;
    determining, by a processor, at least one control output based on driver commands and the wheel moment adjustment command for each wheel; and
    selectively controlling, by a processor, at least one component associated with at least one of an active safety system and a chassis system of the vehicle based on the at least one control output.

2. The method of claim 1, wherein the data includes at least one of yaw moment data, longitudinal force data, and lateral force data.

3. The method of claim 1, wherein the determining the at least one control output comprises blending determined driver commands, the determined wheel moment adjustment commands, and determined corrections.

4. The method of claim 1, wherein the determining the at least one control output comprises determining a feed forward map from the center of gravity data to vehicle corner data.

5. The method of claim 4, wherein the determining the feed forward map is based on a holistic vehicle control model that takes into account tire slip.

6. The method of claim 4, wherein the determining the at least one control output comprises using an inverse map from the vehicle corner data to the center of gravity data to correct commands.

7. The method of claim 6, wherein the correction is based on at least one of wheel slip corrections and steering corrections.

8. The method of claim 1, wherein the determining the wheel moment adjustment command is based on a desired slip ratio.

9. The method of claim 1, wherein the desired slip ratio is based on tire characteristics.

10. A system for controlling a component of a vehicle, comprising:
    a non-transitory computer readable medium comprising:
        a first module that receives, by a processor, data associated with a center of gravity of the vehicle, and that determines, by the processor, a wheel moment adjustment command for each wheel of the vehicle based on the received data;
        a second module that determines, by the processor, at least one control output based on driver commands and the wheel moment adjustment command for each wheel; and
        a third module that selectively controls, by the processor, at least one component associated with at least one of an active safety system and a chassis system of the vehicle based on the at least one control output.

11. The system of claim 10, wherein the data includes at least one of yaw moment data, longitudinal force data, and lateral force data.

12. The system of claim 10, wherein the second module determines the at least one control output by blending determined driver commands, the determined wheel moment adjustment commands, and determined corrections.

13. The system of claim 10, wherein the second module determines the at least one control output based on a feed forward map from the center of gravity data to vehicle corner data.

14. The system of claim 13, wherein the second module determines the feed forward map based on a holistic vehicle control model that takes into account tire slip.

15. The system of claim 13, wherein the second module determines the at least one control output based on an inverse map from the vehicle corner data to the center of gravity data to correct the commands.

16. The system of claim 15, wherein the correction is based on at least one of tire slip corrections and steering corrections.

17. The system of claim 10, wherein the first module determines the wheel moment adjustment based on a desired slip ratio.

18. The system of claim 10, wherein the desired slip ratio is based on tire characteristics.

19. A vehicle, comprising:
    at least one component associated with at least one of an active safety system and a chassis system; and
    a control module comprising:
        a non-transitory computer readable medium comprising:
            a first module that receives, by a processor, data associated with a center of gravity of the vehicle, and that determines, by the processor, a wheel moment adjustment command for each wheel of the vehicle based on the received data;
a second module that determines, by the processor, at least one control output based on driver commands and the wheel moment adjustment command for each wheel; and
a third module that selectively controls, by the processor, at least one component associated with at least one of an active safety system and a chassis system of the vehicle based on the at least one control output.

\* \* \* \* \*